United States Patent [19]

Tuft et al.

[11] Patent Number: 5,020,773
[45] Date of Patent: Jun. 4, 1991

[54] ACTUATOR ASSEMBLY WITH PERMANENTLY MOUNTED MONITORING SYSTEM

[75] Inventors: Richard H. Tuft, Wallingford; Robert L. Leon, Maple Glen, both of Pa.

[73] Assignee: Liberty Technology Center, Inc., Conshohocken, Pa.

[21] Appl. No.: 468,409

[22] Filed: Jan. 22, 1990

Related U.S. Application Data

[63] Continuation-in-part of Ser. No. 232,392, Aug. 15, 1988, Pat. No. 4,911,004, which is a continuation-in-part of Ser. No. 87,541, Aug. 20, 1987, Pat. No. 4,805,451, and Ser. No. 185,210, Apr. 22, 1988, Pat. No. 4,879,901.

[51] Int. Cl.⁵ .......................................... G01M 19/00
[52] U.S. Cl. .................. 251/129.12; 73/168; 324/422; 340/644
[58] Field of Search .................. 251/129.11, 129.12, 251/129.13; 137/554; 73/168; 324/422; 340/524, 686, 687, 644

[56] References Cited

U.S. PATENT DOCUMENTS

| | | | |
|---|---|---|---|
| 4,578,669 | 3/1986 | Woods | 340/524 X |
| 4,672,310 | 6/1987 | Sayed | 340/644 X |
| 4,712,071 | 12/1987 | Charbonneau et al. | 73/168 X |
| 4,805,451 | 2/1989 | Leon | 73/168 |
| 4,856,327 | 8/1989 | Branam et al. | 73/168 |
| 4,869,102 | 9/1989 | Hale et al. | 73/168 |
| 4,879,901 | 11/1989 | Leon | 73/168 |
| 4,888,996 | 12/1989 | Rak et al. | 73/168 X |
| 4,891,975 | 1/1990 | Charbonneau et al. | 73/168 |
| 4,911,004 | 3/1990 | Leon | 73/168 |

Primary Examiner—John Rivell
Attorney, Agent, or Firm—Panitch Schwarze Jacobs & Nadel

[57] ABSTRACT

A monitoring system for use with a conventional actuator system which includes an actuator and control system. The monitoring system comprises a wiring harness including at least three and preferably five ring type current sensors, such as current transformers or Hall effect devices, which are permanently mounted on various leads associated with the control system. The sensors sense currents carried on the leads which are indicative of the state of control system switches connected with the leads. The sensors generate signals responsive to the currents and indicative of the switch states. Each of the sensors is spaced from and wired to a single electrical connector. The connector is adapted to removably mate with a complementary connector to simultaneously electrically couple the complementary connector with each wired sensor. The electrical connector is configured for mounting through a housing to permit simultaneous electrical coupling with each of the sensors of the harness from outside the housing without opening the housing.

22 Claims, 3 Drawing Sheets

ACTUATOR ASSEMBLY WITH PERMANENTLY MOUNTED MONITORING SYSTEM

CROSS-REFERENCE TO RELATED APPLICATIONS

This application is a continuation-in-part of co-pending application Ser. No. 07/232,392 filed 08/15/88, now U.S. Pat. No. 4,911,004, which is a continuation-in-part of application Ser. No. 07/087,541 filed 08/20/87, now U.S. Pat. No. 4,805,451 and application Ser. No. 07/185,210 filed 04/22/88 now U.S. Pat. No. 4,879,901.

BACKGROUND OF THE INVENTION

The present invention relates generally to a system which senses electric motor current and/or switch activation signals when testing and monitoring the condition of an actuator.

Related U.S. Pat. No. 4,805,451 (hereinafter the "'451 Patent") discloses a system for evaluating the condition and performance of a motor operated valve ("MOV") comprising a valve and valve actuator or operator combination.

The system of the '451 Patent was primarily intended to be used with MOV's located in nuclear power and processing plants. The valve operator of such MOV's typically comprise an electric motor and a gear linkage between the motor and a stem of the valve. Each MOV further typically include an actuator control circuit including a plurality of torque and limit control switches monitoring and controlling the operation of the electric motor of the actuator through a main power switch. The main power switch, at least in most nuclear plant installations, is located remotely from the MOV, either at a separate location commonly referred to as the motor control center (MCC) or in the control room of the plant. The control switches may be located at the MOV in a housing, commonly referred to as a valve control box, or remotely from the MOV at the motor control center or possibly the plant control room.

The system of the '451 Patent was designed to overcome problems of older MOV monitoring systems by indirectly measuring valve stem forces through a sensor which could be permanently secured to a yoke coupling the valve with the operator. It further provided a system for evaluating the condition and performance of the valve and the valve operator, and for identifying malfunctions or other problems by using the valve stem force measurements obtained indirectly from the valve yoke strain measurements in conjunction with other measurements. These included valve stem motion, motor current, spring pack motion and torque and limit switch indications. In addition to diagnosing existing valve and valve operator problems, the system provided a method for trending changes in overall valve and valve operator conditions in order to predict future valve or valve operator problems.

The system disclosed in the aforesaid '451 Patent optionally included a motor current sensor for detecting the flow of current to the electric motor and generating electric signals proportional to the motor current. It further optionally included torque and limit switch sensors for detecting the state of torque and limit switches provided with the actuator and for generating electrical signals representative of the states of those switches. When provided, these sensor were coupled with an analysis section including a digital computer and associated peripheral hardware. The computer utilized information obtained from the yoke strain sensor in combination with the motor current sensor to permit diagnosis of various motor and operator problems. By combining information obtained from the yoke strain sensor with information obtained from the torque and limit switch indicator means through the computer, one could diagnose various switch problems.

In order to sense the motor current and switch operations in the manner disclosed in the aforesaid '451 Patent, current sensors were temporarily clamped to the outside of selected motor power and control switch leads. Clamp-on sensors of the type noted were found to nip the wire insulation on occasion and, in some cases, were impossible to position on the lead because the lead was too tightly laced with other leads and/or components. In some instances, the clamp-on sensors did not totally close around the lead and did not yield accurate data. Alternatively, temporary clip leads were placed on terminal strips provided extending from each of the pertinent leads. The clip leads were not permanently or positively mounted and tended to slip off the terminal strips when bumped or vibrated during a test of the valve and valve operator. On occasion during such temporary installation of sensors or clips, they could be placed on the wrong leads.

In addition to the foregoing, each time a test had to be performed on the valve or valve operator, the valve control box and/or the motor control center enclosure had to be opened so that the temporary sensor connections could be made. In nuclear power plants, where the system was initially intended for operation, Federal regulations mandated that extensive reports be prepared and maintained each time either type of enclosure was opened. Literally hundreds of such valves and valve operators typically are located in such plants, many in primary and secondary containment areas where workers would be exposed to radiation from the concentrated radioactive material fueling the reactor while installing and removing the sensors.

The present invention overcomes the problems which arose with the original system using temporarily mounted sensors.

SUMMARY OF THE INVENTION

In one aspect, the invention is a monitoring system for use in an actuator system including an actuator means for providing a mechanical movement, and a control system including a plurality of switch means for controlling the actuator means. The monitoring system comprises a first sensor means for sensing the state of a first one of the control system switch means, a second sensor means for sensing a state of a second one of the control system switch means and a third sensor means for sensing a state of a third one of the control system switch means. The monitoring system further comprises an electrical connector spaced from and wired to each of the first, second and third sensor means and adapted to removably mate with a complementary connector for electrically coupling the complementary connector simultaneously with each of the first, second and third sensor means.

In another aspect, the invention is a monitoring system for use in an actuator system including actuator means for providing a mechanical movement and a control system including a plurality of signal carrying leads, the signals controlling the actuator means. The monitoring system comprises first sensor means mounted on a first lead of the plurality for sensing a first signal carried by the first lead, second sensor means mounted on a second lead of the plurality for sensing a second signal carried by the second lead and third sensor means mounted on a third lead of the plurality for sensing a third signal carried by the third lead. The monitoring system further comprises an electrical connector spaced from and wired to each of the first, second and third sensor means and adapted to removably mate with a complementary connector for electrically coupling the complementary connector simultaneously with each of the first, second and third sensor means.

In another aspect, the invention is an actuator monitoring system harness comprising at least three annular electric current sensor means each having a central opening and a continuous unbroken circumference for permanent mounting on an insulated lead received in the central opening and adapted for sensing current passing through the lead and generating a monitoring signal in response thereto. The harness further comprises an electrical connector spaced from and wired to each of the three sensor means, the connector being adapted to removably mate with a complementary connector for electrically coupling the complementary connector simultaneously with each of the three sensor means.

In another aspect, the invention is a monitoring system installed in an actuator system including actuator means for providing a mechanical movement and a control system including a plurality of signal carrying leads, the signals controlling the actuator means, and housing means for enclosing at least parts of at least some of the signal carrying leads. The monitoring system comprises first sensor means mounted on a first lead of the plurality for sensing a first signal carried by the first lead. The first sensor means and part of the first lead supporting the first sensor means are enclosed by the housing means. The monitoring system further comprises an electrical connector spaced from and wired to the first sensor means. The electrical connector is permanently mounted to the housing means and exposed sufficiently through the housing means to removably mate with a complementary connector outside the housing means for electrically coupling the complementary connector with the first sensor means without opening the housing means.

BRIEF DESCRIPTION OF THE DRAWINGS

The foregoing summary, as well as the following detailed description, will be better understood when read in conjunction with the appended drawings. For the purpose of illustrating the invention, there is shown in the drawings several embodiments which are presently preferred. It should be understood, however, that this invention is not limited to the precise arrangements and instrumentalities shown. In the drawings:

FIG. 4 depicts diagrammatically a preferred monitoring device in the form of a wiring harness adapted for permanent mounting;

FIG. 5 depicts diagrammatically the electrical couplings of one connector of the wiring harness of FIG. 4; and FIG. 6 depicts diagrammatically the wiring connections of a second coupling of the harness of FIG. 4.

DETAILED DESCRIPTION OF THE PREFERRED EMBODIMENT

Figure 1:
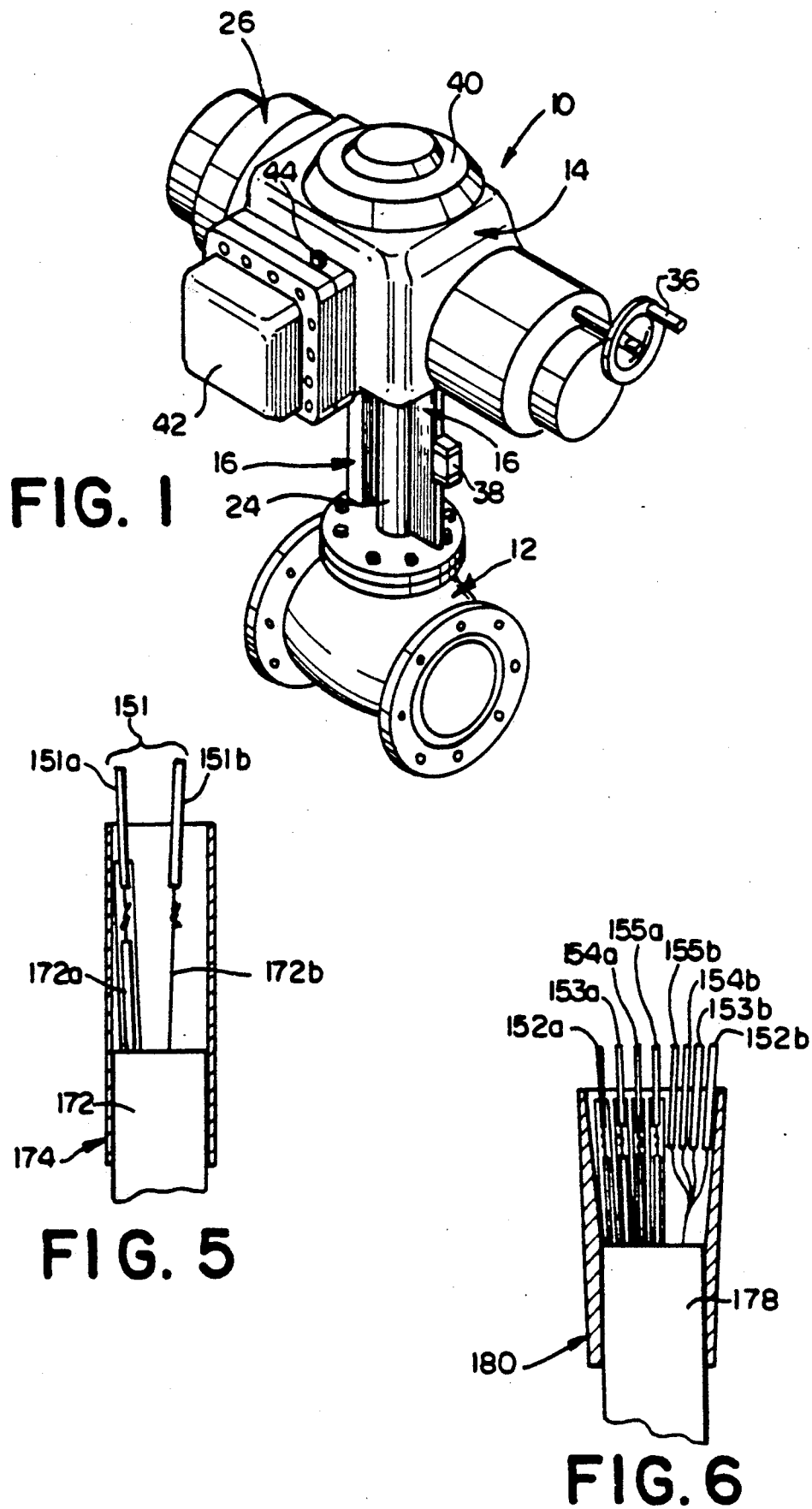
FIG. 1 depicts a typical motor operated valve (MOV) incorporating a preferred embodiment of the invention.
Figure 2:
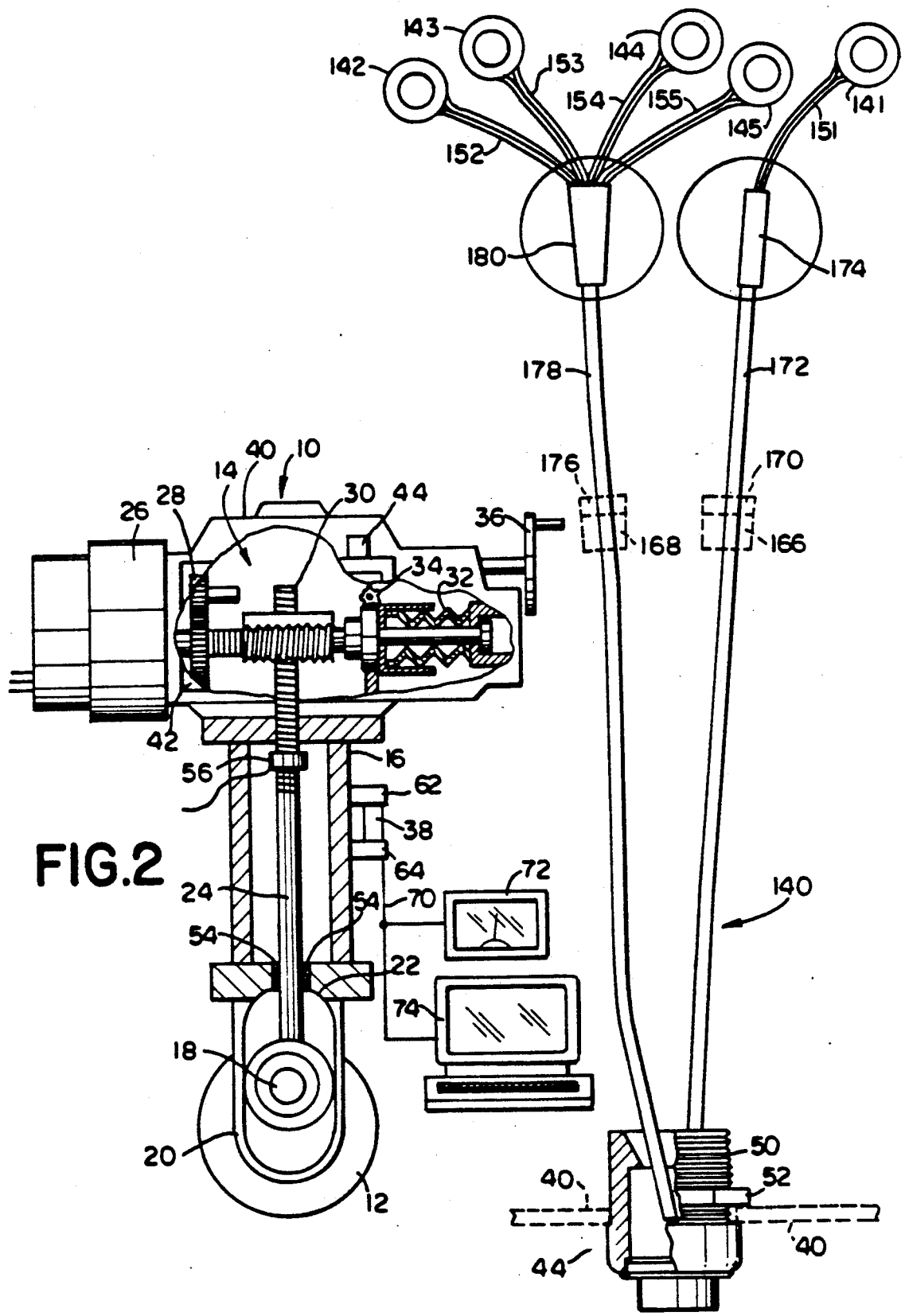
FIG. 2 is a partially broken-away view of the MOV of FIG. 1 showing the valve and valve operator.

Referring now in greater detail to the drawings, in which like numerals indicate like elements throughout, there is shown in FIGS. 1 and 2 a motor-operated gate-type valve, indicated generally at 10, which is generally well known in the art and commercially available from a variety of sources. Motor operated gate valve 10 includes a valve 12 and a valve operator 14 connected together by a valve yoke 16. An electric motor 26 is connected with the operator 14. Together the motor 26 and operator 14 constitute actuator means for providing a mechanical movement, namely a stroke either opening and closing the valve 12. A wheel 36 is geared to the stem 24 of the valve 12 and is typically provided to back-up the motor 26. Mounted to one side of the yoke 16, through posts 62 and 64 secured to the yoke 16 (see FIG. 2), is a yoke strain sensor 38, described in detail in the aforesaid U.S. Pat. No. 4,805,451, incorporated by reference. Also seen in FIG. 1 are a housing 40 of the operator 14 and a valve control box cover 42 removably mounted to one side of the operator housing 40. A female, plug-type electrical connector 44 is mounted to and exposed sufficiently through the housing 40 to removably mate with a complementary connector (not depicted). A valve motion sensor 56, as is described in U.S. Pat. No. 4,879,511, incorporated by reference, may be used to sense stem and valve motion. The yoke strain sensor 38 is coupled by line 70 to a display means comprised of a voltage sensitive meter 72 and, in addition, or, in the alternative, to a computer system 74.

Referring to FIG. 2, the valve 12 includes a movable valve gate 18, a fixed valve seat 20 and a fixed valve back seat 22. The valve gate 18 moves between a seated position on the valve seat 20 and a back-seated position on the valve back seat 22. The valve gate is mounted at one end of a valve stem 24. The valve stem extends through packing 54 in suitable openings in the valve body and through the valve yoke 16 to the valve operator 14. The valve operator 14 preferably is a gear train comprising suitable reduction gears indicated generally at 28, and a combination worm and worm gear indicated generally at 30, coupling the shaft of the motor 26 with the valve stem 24 to raise and lower the valve stem 24 and valve gate 18. The distal end of the worm is connected to a spring pack 32 in a manner well known in the art. A separate small gear 34 is also connected to the worm by way of the spring pack 32. The gear 34, in turn, is connected to a torque switch rocker (see FIG. 3) for deactivating the motor 26 when the gear 34 is turned due to a displacement of the spring pack 32.

Figure 3:
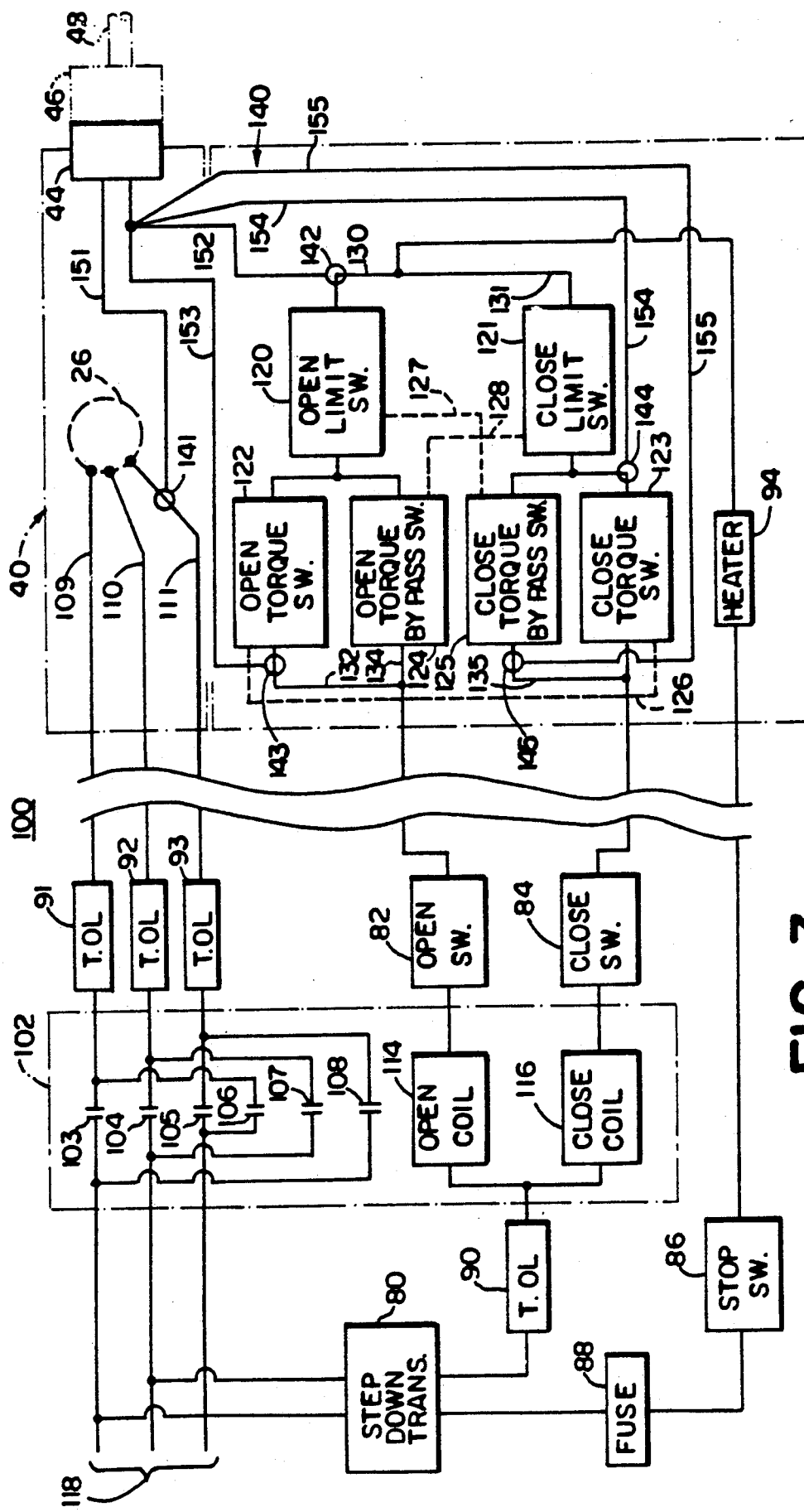
FIG. 3 is a block diagram depicting a preferred mounting of the preferred monitoring system of the present invention with respect to the control system of the MOV of FIGS. 1 and 2.

FIG. 3 depicts in block diagram form a typical control system 100 for the actuator means of the MOV 10. The control system 100 typically comprises a plurality of switch means in the form of electromechanical switches, relays and/or similar functioning elements, for controlling the actuator means represented by the motor 26/operator 14 combination, particularly in response to the mechanical movement provided by the combination. These switches typically include a power switch means located along one or more of the power leads 109–111 coupling the motor 26 to a line voltage/- current power source 118. In the disclosed embodiment, the power switch means is indicated generally at 102. The power switch means 102 is controlled by a separate subcircuit coupled to the line voltage/current source 118 through step down transformer 80. The subcircuit preferably includes six control switch means 120-125. Preferably, the control switch means 120-125 are interconnected and wired to the power switch means 102 through coils 114 and 116 which may be part of the power switch means 102 or part of the subcircuit. The control switch means 120-125 control the supply of electric current to the motor 26 through the power switch means 102 by controlling the state of that switch means 102 for controlling phase connections between a three-wire line voltage source 118 and the three power leads 109-111 to operate the motor 26 in opposing "open" and "close" directions (referring to the valve 12). The power switch means 102 and control switch means 120-125 are not novel.

Preferably, the control switch means include open and close limit switches 120 and 121, respectively, open and close torque switches 122 and 123, respectively, and open and close torque bypass switches 124 and 125, respectively. The open and close torque switches 122 and 123 shown are mounted on a common rocker arm indicated diagrammatically by broken line 126 to respond to excessive torque on the motor valve stem while the valve gate 18 travels between the seat and back seat positions. The open and close torque bypass switches 124 and 125 provide a parallel circuit around each open and close torque switch 122 and 123, respectively, to keep those switches from stopping the motor 26 at the extreme ends of travel where the open and close limit switches 120 and 121 control. The open and close torque bypass switches 124 and 125 are controlled by the close and open limit switches 121 and 120, respectively, being physically coupled to those switches. For example, operation of the close limit switch 121 sets the open torque bypass switch 124 for subsequent operation. These physical couplings between the open limit switch 120 and close torque bypass switch 125 and between the close limit switch 121 and the open torque bypass switch 124 are represented diagrammatically by broken lines 127 and 128, respectively.

Each control switch means 120-125 has at least one associated signal lead 130-135, respectively. Current, magnitude of the current and/or the absence of current through each of the signal leads 130-135 indicates the state of its associated control switch means 120-125, respectively, as closed or open. In this way, each of the leads 130-135 carries electric current signals which indicate the state of its associated control switch means 120-125 for controlling the power switch means 102. The control switches 120, 122 and 124, which control the opening operation of the MOV 10, are coupled through their signal leads 130, 132 and 134, respectively, other unnumbered leads and coil 114 with the three contacts 103-105 of the power switch means 102 causing the motor 26 to open the valve 12 when the contacts 103-105 are closed. Similarly, the remaining control switches 121, 123 and 125 are coupled through their signal leads 131, 133 and 135, respectively, other unnumbered leads and coil 116 with the three contacts 106-108 of the power switch means 102 causing the motor 26 to close the valve 12 when those contacts 106-108 are closed.

Other elements which may be provided in the control system 100 include open, close and stop switch means 82, 84 and 86, respectively, for starting open and close motions of the motor 26 and for stopping the motor 26, respectively. Various protective elements such as a fuse 88 and thermal overload switches 90 and 91-93 can also be provided. Open close and/or stop switch means 82, 84 and 86 can be automatic, manual or both. A resistive heater 94 may also be provided in the enclosure formed by housing 40 and cover 42 to keep the control switch means 120-125 dry.

The various elements of the control system 100 may be located at various places. For example, in most nuclear plants, the power switch means 102 is typically located remotely from the MOV. In some instances, it is located with other power switches controlling other MOV's at a location referred to as the motor control center. However, some or all of the elements of the control circuit 100, including the power switch means 102, may also be located in the plant control room. The coils 114 and 116 are usually but not always located with the power switch means contacts 103-108.

The control switch means 120-125 are typically located at the MOV mounted with other circuit elements supported by components of the operator 14 or its housing 40 or the yoke 16 and fully enclosed with the housing 40 and the removable cover 42. An opening through the housing 40 underlying the cover 42 permits the connection of the various control switch means 120-125 with the mechanical elements of the operator 14. The enclosure formed by the housing 40 and cover 42 may, if desired, be selected to satisfy NEMA Class 12 standards for explosion proof containment. In addition, leads parallel to leads 130-136 and the other unnumbered leads connecting the control switch means 120-125 with one another and coils 114 and 116 are typically provided to illuminate lights or activate other indicators in the control room, the MCC or both to further indicate the state of the control sWitch means 120-125. These additional leads and indicators are typically completely hard-wired into the system and the plant. Neither the parallel leads nor the indicators are depicted for clarity of the figures.

FIG. 3 also depicts diagrammatically a preferred monitoring system in the actuator system. The monitoring system preferably includes a harness indicated generally at 140 with five sensor means 141-145 configured for permanent mounting to leads coupled with five switch means of the plurality of switching means of the control system 100 for sensing the state of the switch means coupled with the mounted lead by sensing electric signals, in particular electric currents in the leads. A first sensor means 141 is coupled with one of three power leads 109-111 coupled with motor 26, for example lead 111, for sensing electric current being supplied to the motor 26 through the power switch means 102 and the one power lead 111. Preferably, the connection is made within the housing 40. Preferably, identical second, third, fourth and fifth sensor means 142-145 are further provided, each mounted on a separate one of the signal leads 130 through 135 connecting the various control switch means 120 through 125 with one another and the power switch means 102. Each of the sensors 142 through 145 is wired preferably permanently by a signal lead 152 through 155, respectively, to the electrical connector 44 which is spaced from each of the sensors 142 through 145 and partially extends through the housing 40 to be exposed sufficiently to removably mate with a compatible connector 46, depicted in phantom in FIG. 3, outside the housing 40. The electrical connector 44 is of a conventional design for removably receiving the compatible electrical connector 46 (phantom FIG. 3) and electrically coupling the sensors 141-145 simultaneously with the complementary connector 46 for passing monitoring signals generated by each of the sensors 141-145 and carried on the signal leads 151 through 155 through the housing 40 and connector 44 to the mated complementary connector 46. A multiconductor cable 48 carries the signals to a suitable device for recording (temporary or permanent) and/or use or display such as the computer 74 or a suitable meter (not depicted).

Preferably, each of the first through fifth sensors 141-145 is an inductive current sensor, preferably a current transformer for sensing alternating current or a Hall effect device for sensing direct current in the lead on which it is mounted through the lead insulation. The passage of a current through a monitored lead 111, 130, 132, 133 or 135 should either induce a current in the sensor 141-145, respectively, or fluctuate a constant current passing through the sensor either of which would constitute a monitoring signal of the sensor. Preferably too, each sensor 141-145 is configured as a ring or annular device having a central opening receiving the lead 109-111 or 130-135 on which the device is mounted and a continuous, unbroken circumference for permanent mounting on the lead 109-111 or 130-135 to prevent the sensor from falling from or being removed from the lead. Each sensor 141-145 is mounted by passing the appropriate power lead 109-111 or control switch lead 130 through 135 through the central opening of the sensor 141-145 and thereafter positioning the sensor 141-145 along the lead by suitable means such as rubber or resilient plastic sleeve external to the insulation of the lead 109-111 or 130-135 and internal to the ring sensor 141-145, which holds the sensor in the proper place, or by plastic collars attached to the lead on either side of the sensor (neither depicted). Permanent mounting means that each of the annular devices 141-145 cannot be opened or taken apart so that it can only be removed from a lead on which it is mounted by destroying the device or by breaking or freeing an end of the lead mounting the sensor from its connection(s). The connector 44 might be passed through a conduit duct or knock-out (neither depicted) if one happens to be provided on the housing 40.

FIG. 4 depicts a preferred sensor-equipped monitoring system harness 140. The harness 140 preferably includes a female-type electrical connector 44 and a pair of coaxial cables 172 and 178. Cable 172 is coupled through lead 151 to the power lead receiving first sensor 141. Cable 178 is coupled through a plurality of the individual signal leads 152-155 to each of the second through fifth sensor means 142-145 respectively. If desired, removably matable connectors 166 and 170 and connectors 168 and 176 (all in phantom) can be provided along cables 172 and 178 to permit the sensors 141-145 to be temporarily uncoupled from the electrical connector 44 for passing connectors 166 and 168 through an opening in a housing 40 to retrofit the harness 140 into existing actuators. The connectors 166/170 and 168/176 can be permanently coupled by any of a variety of conventional means after installation, for example, by covering with a potting material, to make the connections permanent. Threads 50 on connector 44 receive a nut 52 for securing the connector to the housing 40 (partially depicted in phantom).

FIG. 5 shows the permanent connections at connector 174 between the monitoring signal lead 151 from the first sensor 141 and cable 172. The monitoring signal lead 151 is a conductor with two wires 151a and 151b. These attach to wires 172a and 172b of cable 172.

FIG. 6 depicts the permanent connection through connector 180 between the cable 178 and the leads 152-155 from sensors 142-145. Each of the monitoring signal leads 152-155 from sensors 142-145 consists of a pair of wires 152a-155a and 152b-155b, respectively. One of the wires 152a-155a is separately connected with a separate conductor (A, B, D and E) in the cable 178 while each of the remaining wires 152b-155b of each of the signal leads 152-155 is coupled in common with a fifth wire (C), which is the shielding wire of cable 178. The couplings can be solder joints, crimp sleeves or other conventional, permanent wire connections. A total of eight separate contacts are provided at the electrical connector 44. Four separate contacts are provided for each wire 152a-155a. A fifth contact is provided for the commonly connected wires 152b-155b. Sixth and seventh contacts are provided for 151a and 152b and an eighth contact is provided for the shielding on coaxial cable 172.

In MOV's typically encountered in nuclear generating plants, the motor 26 and power switch means operate at 240 or 480 volts AC or at various DC levels while the control subcircuit 118 operates at a lower voltage. Where the actuator motor operates at 240 volts AC, for example, the control subcircuit might be configured to operate at about 115 AC. In such instances the power lead sensor 141 preferably is a current transformer having at least a 20 amp electric current rating. The other sensors 142-145 preferably are also current transformers having equal but lesser ratings, but preferably at least 5 amp ratings.

While the present invention has been described for use in connection with a gate valve and valve operator, one of ordinary skill in the art will appreciate that the device can be used with virtually any type of valve actuator and, indeed, generally with any type of actuator. Moreover, while the system was designed initially for use in nuclear power plants, it will be apparent to one of ordinary skill in the art that the invention may be advantageously used in monitoring all types of actuators in various other environments at least potentially hazardous to human workers. These would include areas processing or conducting nuclear materials or other hazardous materials, environments with potentially explosive atmospheres, environments subjected to extreme heat or extreme cold, and any other environment which may pose a hazard to a worker who must enter the environment to hook up a monitoring system on an actuator located within such environment.

While the harness 140 is shown permanently installed at the MOV, one of ordinary skill will appreciate that the harness could also be permanently installed at the MCC, if parallel leads from the control subcircuit are provided for other indicator purposes, to avoid opening the MCC housing containing the contacts 103-108, etc., or at another area where the pertinent leads are present but located in a housing and where the present invention can be used to avoid having to open the housing.

It will be appreciated by those skilled in the art that changes could be made to the embodiment described above without departing from the broad, inventive concepts thereof. It should be understood, therefore, that this invention is not limited to the particular embodiment disclosed, but is intended to cover all modifications which are within the scope and spirit of the invention as defined by the appended claims.

We claim:

1. In an actuator system including actuator means for providing a mechanical movement and a control system including a plurality of switch means for controlling the actuator means, a monitoring system comprising:
   a first sensor means for sensing a state of a first one of the control system switch means;
   a second sensor means for sensing a state of a second one of the control system switch means;
   a third sensor means for sensing a state of a third one of the control system switch means; and
   an electrical connector spaced from and wired to each of the first, second and third sensor means and adapted to removably mate with a complementary connector for electrically coupling the complementary connector simultaneously with each of the first, second and third sensor means.

2. The actuator system of claim 1 wherein the first switch means is coupled with a first lead carrying an electric signal indicating the state of the first switch means and wherein the first sensor means is a ring device having a central opening receiving the first lead and a continuous, unbroken circumference for permanent mounting on the first lead, the ring device being responsive to the signal carried by the first lead and generating a monitoring signal in response to the first lead signal indicating the state of the first switch means.

3. The monitoring system of claim 2 wherein the first sensor means is a current transformer.

4. The monitoring system of claim 2 wherein the first sensor means is a Hall effect device.

5. The monitoring system of claim 2 wherein the first, second and third sensor means are fully enclosed by a housing and the electrical connector is exposed through the housing sufficiently to removably mate with the complementary connector without opening the housing.

6. The monitoring system of claim 5 wherein the housing also contain at least the first and second switch means.

7. The monitoring system of claim 6 further comprising fourth and fifth sensor means in the housing for sensing states of fourth and fifth switch means, respectively, of the plurality, each of the fourth and fifth sensor means being permanently wired to the electrical connector for simultaneous electric coupling with the first, second and third sensor means to a complementary connector mated with the electrical connector.

8. The monitoring system of claim 7 wherein at least the third and fourth switch means are also enclosed by the housing.

9. The monitoring system of claim 1 further comprising fourth and fifth sensor means in the housing for sensing states of fourth and fifth switch means, respectively, of the plurality, each of the fourth and fifth sensor means being permanently wired to the electrical connector for simultaneous electric coupling with the first, second and third sensor means to a complementary connector mated with the electrical connector.

10. The monitoring system of claim 1 wherein the actuator means is electrically powered, wherein the first switch means is power switch means for supplying line current to the actuator means and wherein the first sensor means senses line current supplied to the actuator means.

11. The monitoring system of claim 10 wherein the second switch means is wired with the first switch means for controlling the state of the first switch means.

12. The actuator system of claim 1 wherein the monitoring system is located in an environment at least potentially hazardous to human workers.

13. The actuator system of claim 12 wherein the monitoring system is located within a nuclear containment area.

14. The actuator system of claim 13 wherein the actuator means is also located within a nuclear containment area.

15. The actuator system of claim 1 wherein the actuator means is coupled with a stem of a valve, wherein the valve and the actuator means are joined by a yoke, the yoke sustaining loads equal and opposite to axial loads on the stem, and further comprising a sensor mounted on the yoke for sensing loads on the yoke and display means electrically coupled with the electrical connector and with the yoke mounted sensor for indicating forces on the valve stem and operation of the first, second and third switch means to monitor valve operation.

16. The actuator system of claim 15 wherein the actuator means comprises an electric motor and wherein the first sensor means is coupled to a power lead supplying electric current to the electric motor for generating a monitoring signal indicating when electric current is supplied to the electric motor on the power lead.

17. The actuator system of claim 16 wherein the monitoring system further comprises at least fourth and fifth sensor means for monitoring the states of fourth and fifth switch means, respectively, of the control system, the fourth and fifth sensor means being wired to the electrical connector, the five sensor means being enclosed in a housing and the electrical connector protruding from the housing sufficiently to removably mate with a complementary connector outside the housing without opening the housing for simultaneously electrically coupling the five sensor means with the mated complementary connector.

18. In an actuator system including actuator means for providing a mechanical movement and a control system including a plurality of signal carrying leads connected to the actuator means, a monitoring system comprising:
   first sensor means mounted on a first lead of the plurality for sensing a first signal carried by the first lead;
   second sensor means mounted on a second lead of the plurality for sensing a second signal carried by the second lead;
   third sensor means mounted on a third lead of the plurality for sensing a third signal carried by the third lead; and
   an electrical connector spaced from and wired to each of the first, second and third sensor means and adapted to removably mate with a complementary connector for electrically coupling the complementary connector simultaneously with each of the first, second and third sensor means.

19. The monitoring means of claim 18 wherein the first, second and third sensor means are enclosed in a housing and wherein the electrical connector protrudes sufficiently through the housing to removably mate with a complementary connector without opening the housing.

20. An actuator monitoring system harness comprising:

at least three annular electric current sensor means each having a central opening and a continuous unbroken circumference for permanent mounting on an insulated lead received in the central opening and adapted for sensing current passing through the lead and generating a monitoring signal in response thereto; and an electric connector spaced from and wired to each of the three sensor means, the connector being adapted to removably mate with a complementary connector for electrically coupling the complementary connector simultaneously with each of the three sensor means.

21. The harness of claim 20 wherein one of the three sensors has a greater electric current rating than the remaining two sensors for monitoring electric currents of greater amperage than amperages the two remaining sensors are rated to monitor.

22. In an actuator system including actuator means for providing a mechanical movement and a control system including a plurality of signal carrying leads connected to the actuator means, and housing means for enclosing at least parts of at least some of the signal carrying leads, a monitoring system comprising:

first sensor means mounted on a first lead of the plurality for sensing a first signal carried by the first lead, the first sensor means and part of the first lead supporting the first sensor means being enclosed by the housing means; and an electrical connector spaced from and wired to the first sensor means, the electrical connector being permanently mounted exposed sufficiently through the housing means to removably mate with a complementary connector outside the housing means for electrically coupling the complementary connector with the first sensor means without opening the housing means.

* * * * *